United States Patent [19]
Feichtinger

[11] Patent Number: 4,763,421
[45] Date of Patent: Aug. 16, 1988

[54] MULTI-COORDINATE PROBE

[75] Inventor: Kurt Feichtinger, Palling, Fed. Rep. of Germany

[73] Assignee: Dr. Johannes Heidenhain GmbH, Traunreut, Fed. Rep. of Germany

[21] Appl. No.: 62,354

[22] Filed: Jun. 11, 1987

Related U.S. Application Data

[63] Continuation of Ser. No. 836,842, Mar. 6, 1986, abandoned.

[30] Foreign Application Priority Data

Mar. 8, 1985 [DE] Fed. Rep. of Germany ....... 3508396

[51] Int. Cl.$^4$ ............................................. G01B 7/00
[52] U.S. Cl. .................................... 33/561; 33/169 R
[58] Field of Search .................. 33/172 E, 169 R, 551, 33/552, 556, 557, 558, 559, 561, 503

[56] References Cited

U.S. PATENT DOCUMENTS 4,136,458  1/1979  Bell et al. ............................... 33/561
4,558,312  12/1985  Yonemoto et al. ................ 33/552 X

FOREIGN PATENT DOCUMENTS 1025994  6/1983  U.S.S.R. ............................ 33/169 R

Primary Examiner—Harry N. Haroian
Attorney, Agent, or Firm—Toren, McGeady & Associates

[57] ABSTRACT

A multi-coordinate probe with a stylus is disclosed wherein the stylus has a mounting or seating location defining its zero position. The stylus is deflectable from the zero position in several coordinate directions and is urged by a restoring force back into its zero position. The mounting location of the stylus is formed by the cooperation of surface areas of a plurality of balls with associated surface areas of support members. The balls and the support members are centrally arranged about the axis of the probe. The balls are fixedly mounted on a mounting member while the support members, which preferably are in the form of cylinder bodies with a V-shaped groove in the surface facing the balls, are, during assembly of the probe, rotatable about their own axis and axially movable to accomplish the desired precision seating of the ball surfaces in the grooves. After the positioning is accomplished, the cylindrical bodies are immovably fixed within the probe casing. A method is also disclosed to facilitate the precision seating of the balls in the grooves during assembly of the probe.

12 Claims, 2 Drawing Sheets

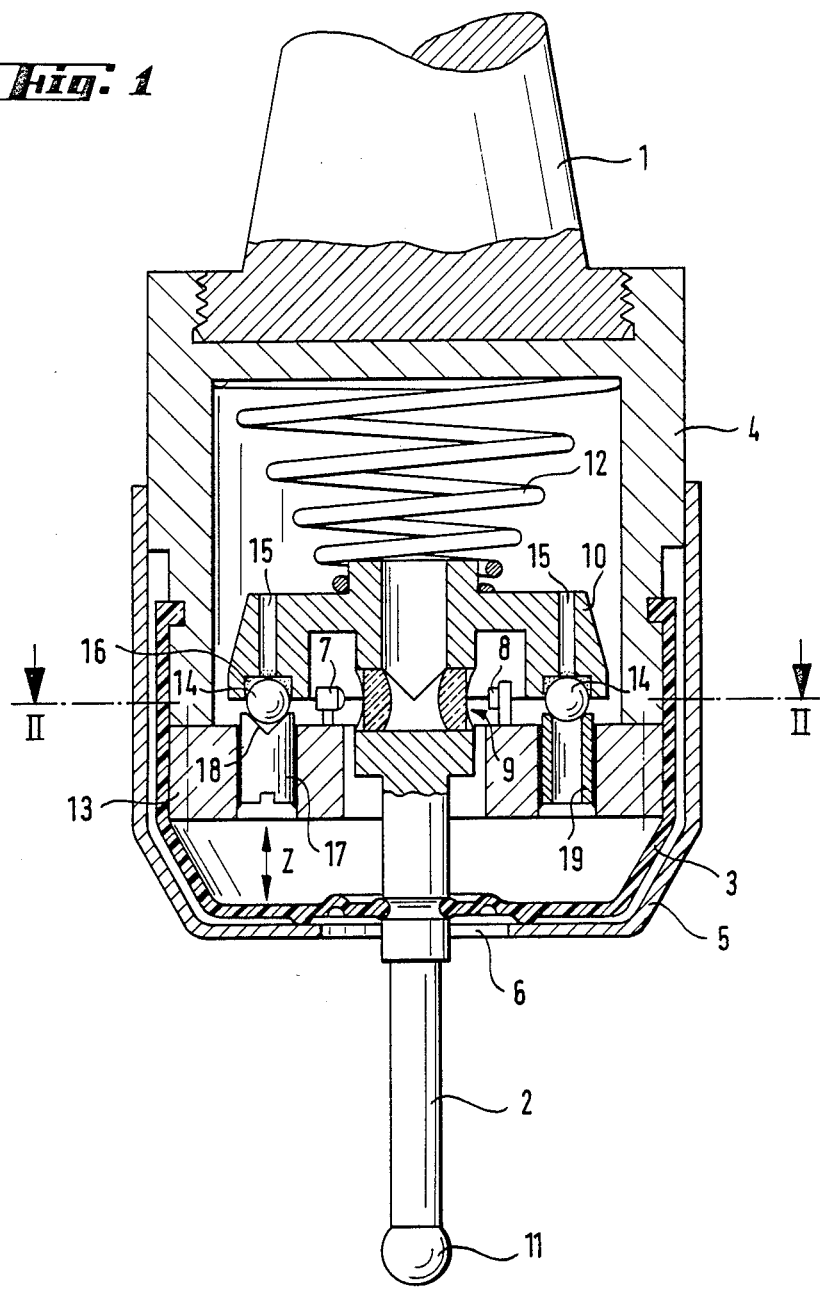

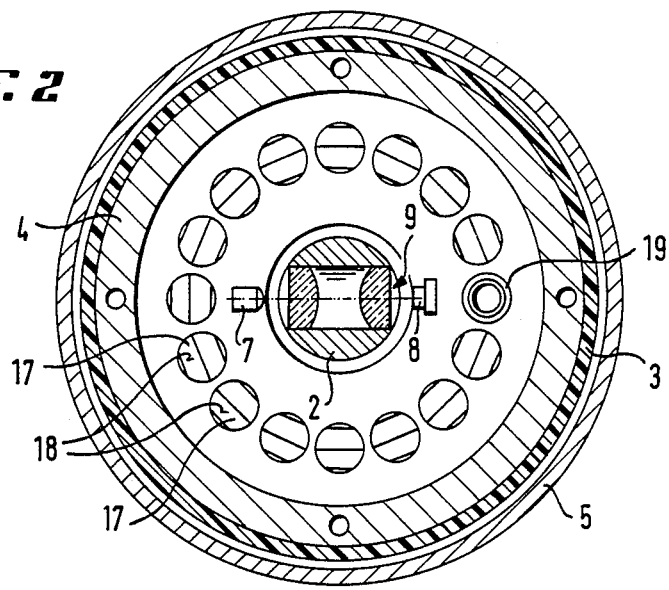
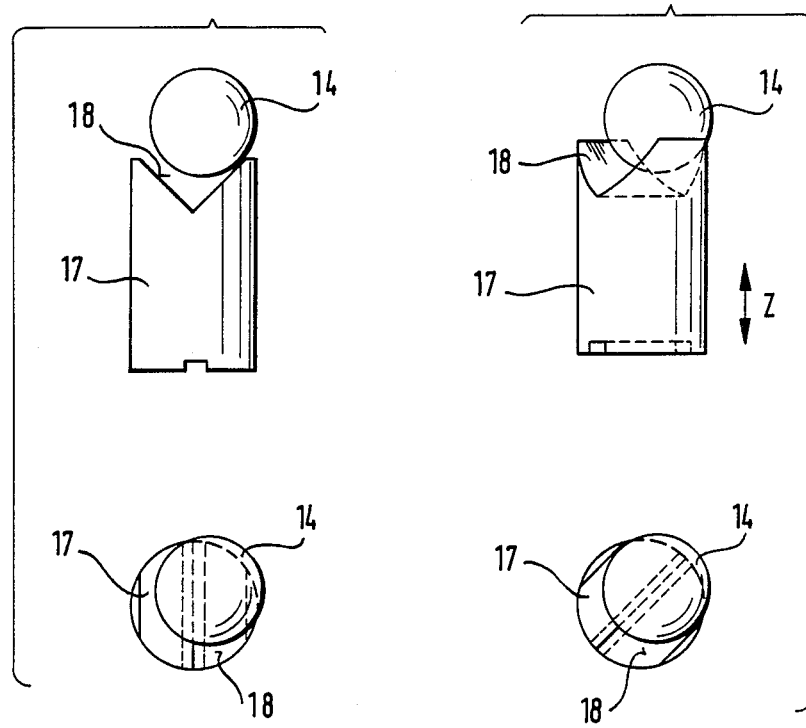

4,763,421

MULTI-COORDINATE PROBE

This is a continuation of application Ser. No. 836,842, filed Mar. 6, 1986, now abandoned.

FIELD OF THE INVENTION

The invention generally relates to probes and is particularly directed to a multi-coordinate probe wherein a stylus which is normally in zero or rest position, is deflectable in several coordinate directions and is urged by a restoring force, such as a spring, back into the exact same zero position.

Multi-coordinate probes of this kind are used in measuring systems and in machine tools for the measurement of workpieces. The exactness and reproducibility of the measurement, both in respect to measuring and switching probes, is largely dependent on the mounting or seating of the stylus in the probe casing. The invention, therefore, is particularly concerned with a mounting arrangement and method for the stylus.

PRIOR ART

Attention is directed to U.S. Pat. Nos. 4,153,998 and 4,270,275, as well as West German Nos. 835,545 and 838,104.

BACKGROUND INFORMATION

Numerous different constructions for multi-coordinate probes, both of the switching and of the measuring kind, have been proposed in the past. In both types of probes, it is of decisive importance that the stylus, after having been deflected in any of the directions in which it can move, is reliably returned into its zero position. For this purpose, a variety of constructions have been attempted in which the mounting or seating of the stylus relative to the probe casing is designed in a manner intended to accomplish this purpose.

One of those constructions is disclosed in German Offenlegungsschrift No. 28 41 424. This publication is concerned with a probe wherein the stylus has a three point seating. Three V-grooves are arranged in star formation in the bottom portion of the probe casing. Three pins with spherical surface are fixed in a mounting plate for the stylus. The mounting plate is urged by a spring in the direction of the probe casing bottom, while the pins assume in the associated V-grooves a predetermined position into which they are supposed to return after deflection of the stylus.

Another construction of this type is disclosed in European Application No. A2-0088596 which also teaches a seating or bearing arrangement at three locations. In this prior art proposal, seating locations are distributed in the same plane and uniformly over the circumference. Three balls are arranged in the bottom of the probe casing. These balls, for assembly purposes, are movable in direction of the stylus. The mounting plate has three counter bearings or abutments of different design. One of the counter bearings serves the purpose of preventing rotation of the plate and is in the form of a bore. The second counter bearing has a fixed V-groove which is directed towards the center point of the mounting plate. Finally, the third counter bearing is a plane member which extends parallel to the mounting plate and perpendicular to the force component of the compression spring.

It is generally known in this art that measuring force differentials and the bending-dependent switching path differentials associated therewith, are significantly reduced in different probing direction, by increasing the number of mounting locations for the stylus. However, in the known probe systems, an increase in the number of seating locations also significantly increases the expenditure necessary for manufacturing the mounting locations with the required precision fit. This in turn creates the danger that the syste becomes statically overdefined and stable equilibrium conditions are lost. This is so because even in the manufacture of seatings with precision fit, certain manufacturing tolerances cannot be avoided, resulting in static instability.

The prior art as embodied by EP-2A-0088596 attempts to avoid static overdefinition or underdefinition by providing the different designs at the three seating locations.

Seating locations of different design are thus necessary in both prior art systems, if more than three such locations are to be provided. While this results in high zero position stability for the stylus, the different construction for the seating locations has also a distinct disadvantage. This is so, because when the stylus ball probes an object and dependent on the probing direction, a deflection of the stylus in different preferred directions is probable.

OBJECTS OF THE INVENTION

It is a primary object of the invention to overcome the disadvantages of the prior art and to provide a mounting for the stylus of multi-coordinate probes wherein the position of the movable stylus-bearing portion relative to the stationary portion of the probe is determined and defined in highly precise manner such that defined and exactly reproducible probing conditions prevail and are assured in all probing directions.

Another object of the invention is to provide a probe of the indicated kind which enables precise, exact and simple assembly of a plurality of identically constructed mounting locations without requiring the use of precision-produced structural component parts.

It is also an object of the invention to provide a method for providing a plurality of identical mounting locations with precision fit in a simple and superior manner.

Generally, it is an object to improve on the art of mounting a stylus of a probe so that it always returns to the exact same zero position.

DESCRIPTION OF THE DRAWINGS

A preferred embodiment of the inventive probe construction is shown in the accompanying drawings in which FIG. 1 is an axial section through a probe, FIG. 2 is a section in the plane II—II of FIG. 1 with the mounting member for the stylus removed and FIG. 3a and FIG. 3b illustrate the principle or method of adjusting a mounting location to achieve the desired precise fit.

DETAILED DESCRIPTION OF THE DRAWINGS

An overall view of the entire construction of a multi-coordinate probe in accordance with the invention is shown in FIG. 1. The probe is of the switching kind for use in a measuring system. The probe, by means of shaft 1, is insertable into a spindle of the measuring or processing machine such as a machine tool (not shown). A stylus 2 having a probing ball 11 at its lower end can be deflected in all directions. A washer or packing 3 seals or closes the intermediate space between the probe casing 4 and the stylus 2. An outer sheet metal protecting member 5 prevents damage to the packing 3 by hot shavings or the like, but has an opening or free space 6 which permits limited deflection of the stylus 2 out of its zero position.

A detector arrangement 7, 8, 9 is positioned within the probe casing to be responsive to the deflections of the stylus 2 and generates upon a predetermined deflection amount a probing pulse which is utilized for controlling a machine tool or for determining the instant of the measuring value transfer of a coordinate measuring machine. The detector arrangement 7, 8, 9 comprises in the embodiment here shown an optical transmitter 7 which is stationarily mounted in the probe casing 4 as well as stationary differential photo element 8 which is aligned with the transmitter 7. A lens system 9 is arranged in the optical axis of the two elements 7, 8 and is fixedly mounted on the movable stylus 2.

A stylus mounting plate or member 10 is fixedly connected to the stylus 2. The upper surface of the plate 10 is in connection with the probe casing 4 by means of spring 12. The counter surface of the plate constitutes a portion of the seating of the plate 10 on the probe casing bottom or support structure 13. This seating has to be accomplished in precise manner since a static under- or overdefinition causes measuring errors.

During a probing operation on a workpiece or object, the mounting plate 10 is maintained in place by the action of the spring 12 whose force counters the contact pressure of the stylus ball 11 on the workpiece and thus prevents that the plate 10 is rocked or tilted or lifted from its seating when this force is below a predetermined value. As long as the plate 10 is maintained against the probe casing bottom 13 by means of the spring 12, plate 10 and probe casing 4 form one unit with the freedom degree zero. After a deflection of the stylus, the spring 12 is charged in such a manner that it restores the plate 10 to its seating location on the probe casing bottom 13.

The seating, designed as a multi-point bearing mount comprises, in accordance with the invention, a plurality of balls 14 which are uniformly and in a single plane distributed over the circumference of the plate or member 10 and anchored therein. Bores 15 are provided in the plate 10 at the mounting base for each ball 14. Adhesive 16 is supplied through the bores 15 to cement the balls to the plate 10. Damaged balls 14 may be removed by inserting a tool through the bores. It will be noted that sixteen balls 14 are provided in the embodiment shown. Each of the sixteen balls 14 is associated with a counter-bearing or support member in the form of a cylindrical body 17. Fifteen of the cylindrical bodies 17, at the end which faces the balls 14, are provided with a V-groove 18. However, one of the cylindrical bodies is in the form of a hollow cylinder 19, without V-groove, in order to prevent rotation of plate 10.

The cylindrical bodies 17 are placed in such a manner that their longitudinal axes extend parallel to the longitudinal axis of the stylus 2 when the latter is in its zero position. So that each ball 14 enters the associated V-groove 18 in a defined and precise manner to achieve a precision fit, each of the cylindrical bodies 17 is initially mounted so as to be rotatable about its longitudinal axis and also movable along its longitudinal axis. If during assembly of the plate member 10 in the probe casing 4, the center point of any of the balls does not coincide with the base of the V-groove 18 (see FIG. 3a) in the required manner, the respective cylindrical body 17 automatically adapts itself to the ball 14 in that the former rotates about its own longitudinal axis (see FIG. 3b) to the required extent and, if necessary, moves axially in the Z direction (see arrow Z of FIGS. 1 and 3a) to adapt itself to the surface of the ball 14, thereby to achieve a precision fit.

After this relatively simple adjustment procedure of the cylindrical bodies 17, the latter are fixedly secured to the probe casing bottom 13. In a preferred embodiment, the cylindrical bodies 17 are thus cemented to the structure 13. Each of the several seating or bearing locations is thus formed by the cooperation of the free surface regions of the balls 14 with the associated surface regions of the V-grooves 18, the latter being provided in the cylindrical bodies 17. The cylindrical bodies 17 in turn are fixed to the probe casing 4.

A precise and simple alignment procedure of the V-grooved 18 of the cylindrical bodies 17 to the balls 14 is enhanced by proceeding as follows: Prior to the hardening or curing of the adhesive which is used for ultimately cementing the bodies 17 to the structure 13, the cylindrical bodies 17 are subjected to vibration by means of a vibration device (not shown). Due to the vibration and the described movability of the cylindrical bodies 17, the balls will quickly and substantially automatically find their desired seating position in the V-grooves so that the proper precision fit is accomplished. The vibration device may contain a spring arrangement which causes the proper adjustment of each cylindrical body 17 in Z direction. By continuously reducing the high frequency vibration amplitudes, it is assured that the cylindrical bodies 17 with increasing hardening degree of the adhesive moreover rotate into a stable position about their own axis.

It should be appreciated that the cylindrical bodies need not necessarily be a component of the probe casing bottom. Rather it is also feasible to integrate them into the plate member 10. Moreover, in addition to the shown possibility of pairing the seating elements, other embodiments could be used. Thus, for example it is within the scope of this invention to use the following variation: pin with spherical surface/cylindrical body with V-groove.

As shown in FIGS. 1 and 2, one of the cylindrical bodies is in the form of a hollow cylinder 19 without a V-groove. This is done to secure the plate member 10 against rotation while the cylinder 19 with the associated ball still acts as a seating location. Other means may, however, be provided to prevent rotation of the plate 10. Thus, for example, a spherical depression or a negative pyramid point may be provided for this purpose.

An advantageous structural modification of the described embodiment is that the cylindrical bodies may be secured to the casing bottom with a uniform inclination in the direction of the probing ball. Inclination of the cylindrical bodies is particularly advantageous if it is such that the longitudinal axis of each cylindrical body passes through the center point of the probing ball of the stylus. Such arrangement assures in each probing direction a defined force distribution from probing ball to seating location. This holds true even at larger deflection of the stylus.

It will be appreciated from the above that the inventive arrangement assures return of the stylus into its zero position after each deflection with great precision.

By positioning the same kind of seating locations uniformly around the circumference of the plate 10 in a single plane, the deflection of the probing ball, in dependence on the probing direction, into different preferred directions is largely prevented. This, in turn, assures exact repeatability of the measurement independent from the probing direction.

The assembly of the seating locations pursuant to the invention, is exceedingly simple and results in locations of great precision without requiring any particular skills. Static over- or underdefinition of the mounting system is effectively avoided.

In the following claims, the inclusion of reference numerals serves the purpose of explanation and is not meant to have any limiting effect.

What is claimed is:

1. In a multi-coordinate probe with a casing and at least one stylus (2), wherein said stylus (2) has a mounting location defining its zero position and wherein said stylus is deflectable from said zero position in several coordinate directions and is urged by a restoring force bach into its zero position, said mounting location of the stylus (2) being formed by the cooperation of the surface areas of a plurality of ball bodies (14) with associated surface areas of a plurality of support members (17) and wherein the ball bodies (14) and their associated support members (17) are centrally arranged about the axis of the probe, the improvement which comprises:
   (a) a mounting member (10) to which said stylus is secured, said surface areas of said ball bodies (14) being secured to said mounting member (10) so as to have a fixed position relative thereto,
   (b) a support structure (13) for said support members (17), each of said support members, during assembly of the probe, being mounted in a bore of said support structure so as to be rotatable about their own axes and axially movable independently of their so as to adapt themselves to said surface areas of the ball bodies to provide a precision fit between the surface areas of the ball bodies and the surface areas of the support memb⒭rs, said support members, after such adaption, being immovably secured to said support structure (13), and
   (c) the number of said ball bodies with the associated support members being in excess of three and more than three of said support members having essentially the same surface shape in the area of said precision fit with the associated ball bodies, said surface shape for each support member (17) including a groove extending transversely to the axis of the probe so that rotation and axial movement of each support member before it is secured to said support structure (13) causes a respective ball body (14) to be adapted into a deepest possible position in the groove of a respective support member.

2. The improvement of claim 1, wherein each of said support members is in the form of a cylindrical body (17), the surface area of each cylindrical body facing an associated ball body (14) having said groove for engagement with the surface area of the associated ball body.

3. The improvement of claim 2, wherein said grooves are V-shaped grooves.

4. The improvement of claim 1, wherein said mounting member (10) has bores passing through said member, said ball bodies being secured in said bores, while said support structure (13) is secured to the casing (4) of the probe.

5. The improvement of claim 1, wherein said support structure for said cylindrical bodies is secured to the casing of the probe.

6. The improvement of claim 1, further comprising means for preventing rotation of said mounting member (10), said means being formed by at least one of said ball bodies and an associated hollow cylinder (19) secured to said support structure, said one ball body being capable of engagement with the hollow cylinder.

7. The improvement of claim 3, wherein sixteen ball bodies and fifteen associated cylindrical bodies with V-shaped grooves are provided, one of said ball bodies being associated with a hollow cylinder (19) for preventing rotation of the mounting member (10) when said one ball body engages the hollow cylinder, said hollow cylinder being secured to said support structure.

8. A method of mounting a stylus, which is secured to a movable mounting member, in a probe casing having an opening, so that the stylus extends through the opening and is deflectable from a zero position into coordinate directions and is restorable after deflection into the exact same zero position, said method comprising:
   (a) positioning said mounting member having in excess of three ball elements circumferentially secured thereto into bearing contact with a support structure which is part of or secured to the casing,
   (b) placing a plurality of cylindrical bodies in bores of said support structure so that each of said cylindrical bodies is movable in the axial direction and rotatable about its own axis with at least some of said cylindrical bodies having a groove facing said ball elements so that each groove receives a ball element for seating,
   (c) moving said cylindrical bodies in the axial direction until between the surface region of each cylindrical body and the surface region of the associated ball element point contact is established, whereupon, while maintaining said point contact, said cylindrical bodies are rotated about their own axes until a stable position has been achieved in which each ball body is at the lowest possible position on the respective groove,
   (d) thereafter securing the cylindrical bodies in the support structure so as to be immovable relative thereto, and
   (e) biasing said mounting member toward said support structure.

9. The method of claim 8, wherein each of said cylindrical bodies has a V-groove, each of said V-grooves receiving an associated ball element for precision fit seating.

10. The method of claim 8, wherein one of said cylindrical bodies is in the form of a hollow cylinder without V-groove, one of said ball elements being moved into seating contact with the facing end of the hollow cylinder to prevent rotation of said mounting member.

11. A method of mounting a stylus, which is secured to a movable mounting member, in a probe casing having an opening, so that the stylus extends through the opening and is deflectable from a zero position into coordinate directions and is restorable after deflection into the exact same zero position, said method comprising:
   (a) positioning said mounting member having a plurality of ball elements circumferentially secured thereto into bearing contact with a support structure which is part of or secured to the casing, (b) placing a plurality of cylindrical bodies in said support structure so that each of said cylindrical bodies is movable in the axial direction and rotatable about its own axis with at least some of said cylindrical bodies having a V-groove facing said ball elements so that each V-groove receives a ball element for seating, (c) vibrating said cylindrical bodies relative to said ball elements so that each ball element associated with a V-groove assumes a precision fit therein, (d) thereafter securing the cylindrical bodies in the support structure so as to be immovable relative thereto, and (e) biasing said mounting member toward said support structure.

12. A method of mounting a stylus, which is secured to a movable mounting member, in a probe a casing having an opening, so that a stylus extends through the opening and is deflectable from a zero position into coordinate directions and is restorable after deflection into the exact same zero position, said method comprising:

(a) positioning said mounting member having in excess of three ball elements circumferentially secured thereto into bearing contact with a support structure which is part of or secured to the casing, (b) placing a plurality of cylindrical bodies in said support structure so that each of said cylindrical bodies is movable in the axial direction and rotatable about its own axis with at least some of said cylindrical bodies having a V-groove facing said ball elements so that each V-groove receives a ball element for seating, (c) vibrating said cylindrical bodies relative to said ball elements so that each ball element associated with a V-groove assumes a precision fit therein, (d) thereafter securing the cylindrical bodies in the support structure so as to be immovable relative thereto, and (e) biasing said mounting member toward said support structure.

* * * * *